(12) United States Patent
King et al.

(10) Patent No.: US 10,860,963 B2
(45) Date of Patent: Dec. 8, 2020

(54) METHODS AND SYSTEMS FOR VIDEO-BASED COMMUNICATION ASSESSMENT

(71) Applicant: NATIONAL BOARD OF MEDICAL EXAMINERS, Philadelphia, PA (US)

(72) Inventors: Ann King, Philadelphia, PA (US); Kathleen Mazor, Amherst, MA (US)

(73) Assignee: National Board of Medical Examiners, Philadelphia, PA (US)

(*) Notice: Subject to any disclaimer, the term of this patent is extended or adjusted under 35 U.S.C. 154(b) by 229 days.

(21) Appl. No.: 15/655,299

(22) Filed: Jul. 20, 2017

(65) Prior Publication Data
US 2019/0026678 A1 Jan. 24, 2019

(51) Int. Cl.
| | | |
|---|---|---|
| G09B 7/02 | (2006.01) | |
| G06Q 10/06 | (2012.01) | |
| G06Q 10/10 | (2012.01) | |
| G09B 19/00 | (2006.01) | |

(52) U.S. Cl.
CPC ....... *G06Q 10/06398* (2013.01); *G06Q 10/10* (2013.01); *G09B 7/02* (2013.01); *G09B 19/00* (2013.01)

(58) Field of Classification Search
CPC ............... G09B 7/00; G09B 7/02; G09B 7/04
See application file for complete search history.

(56) References Cited

U.S. PATENT DOCUMENTS

| | | | | |
|---|---|---|---|---|
| 5,991,595 A | * | 11/1999 | Romano | G09B 7/02 382/321 |
| 10,029,178 B1 | * | 7/2018 | Dunn | A63F 13/355 |
| 2002/0001795 A1 | * | 1/2002 | Bejar | G09B 7/02 434/350 |
| 2004/0018477 A1 | * | 1/2004 | Olsen | G09B 5/065 434/307 R |
| 2004/0186743 A1 | * | 9/2004 | Cordero, Jr. | G06Q 10/1053 705/321 |
| 2009/0176198 A1 | * | 7/2009 | Fife | G09B 7/02 434/353 |
| 2014/0162240 A1 | * | 6/2014 | Wheeler | G09B 7/00 434/362 |
| 2014/0255886 A1 | * | 9/2014 | Wang | G09B 5/00 434/169 |
| 2014/0272804 A1 | * | 9/2014 | Hou | G09B 7/02 434/11 |

(Continued)

OTHER PUBLICATIONS

Accreditation Council for Graduate Medical Education. ACGME Common Program Requirements. 2015; Available from: http://www.acgme.org/acgmeweb/Portals/0/PFAssets/ProgramRequirements/CPRs_07012015.pdf., 32 pages.

(Continued)

*Primary Examiner* — Peter R Egloff
(74) *Attorney, Agent, or Firm* — RatnerPrestia

(57) ABSTRACT

Methods and systems for assessing communication skills of a professional are described. The professional may be a healthcare provider or any other professional having a position in which communication skills are highly valued. The communication skills of the professional are assessed using crowd-sourced raters to increase reliability of results. Feedback reports may also be created for use by the professional to improve communication skills.

15 Claims, 2 Drawing Sheets

(56) References Cited

U.S. PATENT DOCUMENTS

2015/0161903 A1* 6/2015 Colliander ............... G09B 7/06
434/350

OTHER PUBLICATIONS

Liaison Committee on Medical Education (LCME). Functions and Structure of a Medical School, Standards for Accreditation of Medical Education Programs Leading to the M.D. Degree. 2015; Available from: http://lcme.org/wp-content/uploads/filebase/standards/2016-17_Functions-and-Structure_2015-6-16.docx, 3 pages.
King, A. and R.B. Hoppe, "Best practice" for patient-centered communication: a narrative review. Journal of graduate medical education, 2013. 5(3): pp. 385-393.
Rodriguez, H.P., et al., The effect of performance-based financial incentives on improving patient care experiences: a statewide evaluation. Journal of general internal medicine, 2009. 24(12): pp. 1281-1288.
Damberg, C.L., et al., Paying for performance: implementing a statewide project in California. Quality Management in Healthcare, 2005. 14(2): pp. 66-79.
Institute of Medicine of the Natural Academies, Rewarding Provider Performance, Aligning Incentives in Medicare, P. Committee on Redesigning Health Insurance Performance Measures, and Performance Improvement Programs, Board on Health Care Services, Editor 2007, The National Academies Press: Washington, D.C., 34 pages.
Hoppe, R.B., et al., Enhancement of the assessment of physician-patient communication skills in the United States Medical Licensing Examination. Acad Med, 2013. 88(11): pp. 1670-1675.
Epstein, R.M. and R.L. Street JR, Patient-centered communication in cancer care: promoting healing and reducing suffering. 2007, 222 pages.
Street, R.L., et al., How does communication heal? Pathways linking clinician—patient communication to health outcomes. Patient education and counseling, 2009. 74(3): pp. 295-301.
Mazor, K.M., et al., Patients' and family members' views on patient-centered communication during cancer care. Psycho-Oncology, 2013. 22(11): pp. 2487-2495.
Street, R.L., How clinician-patient communication contributes to health improvement: modeling pathways from talk to outcome. Patient education and counseling, 2013. 92(3): pp. 286-291.
De Haes, H. and J. Bensing, Endpoints in medical communication research, proposing a framework of functions and outcomes. Patient education and counseling, 2009. 74(3): pp. 287-294.
Mazor, K.M., et al., Toward patient-centered cancer care: patient perceptions of problematic events, impact, and response. Journal of Clinical Oncology, 2012. 30(15): pp. 1784-1790.
Silk, K.J., et al., The role of patient-centeredness in predicting compliance with mammogram recommendations: An analysis of the health information national trends survey. Communication Research Reports, 2008. 25(2): pp. 131-144.
Mazor, K.M., et al., The video-based test of communication skills: description, development, and preliminary findings. Teaching and learning in medicine, 2007. 19(2): pp. 162-167.
Van Vliet, L.M., et al., The validity of using analogue patients in practitioner-patient communication research: systematic review and meta-analysis. Journal of general internal medicine, 2012. 27(11): pp. 1528-1543.
Blanch-Hartigan, D., et al., Can naive viewers put themselves in the patients' shoes?: reliability and validity of the analogue patient methodology. Medical care, 2013. 51(3): pp. e16-e21.
Goff, S.L., et al., Patients' beliefs and preferences regarding doctors' medication recommendations. Journal of general internal medicine, 2008. 23(3): pp. 236-241.
Mazor, K.M., et al., Assessing professionalism in the context of an objective structured clinical examination: an in-depth study of the rating process. Medical education, 2007. 41(4): pp. 331-340.
Mazor, K.M., et al., Disclosure of medical errors: what factors influence how patients respond? Journal of general internal medicine, 2006. 21(7): pp. 704-710.
Paolacci, G., J. Chandler, and P.G. Ipeirotis, Running experiments on amazon mechanical turk. Judgment and Decision making, 2010. 5(5): pp. 411-419.
Buhrmester, M., T. Kwang, and S.D. Gosling, Amazon's Mechanical Turk a new source of inexpensive, yet high-quality, data? Perspectives on psychological science, 2011, 6(1): pp. 3-5.
Berinsky, A.J., G.A. Huber, and G.S. Lenz, Evaluating online labor markets for experimental research: Amazon. com's Mechanical Turk. Political Analysis, 2012. 20(3): pp. 351-368.
Levinson, W., C.S. Lesser, and R.M. Epstein, Developing physician communication skills for patient-centered care. Health Affairs, 2010. 29(7): pp. 1310-1318.
Mazor, K.M., et al., Assessing patient-centered communication in cancer care: stakeholder perspectives. Journal of Oncology Practice, 2013. 9(5): pp. e186-e193.
Ranard, B.L., et al., Crowdsourcing—harnessing the masses to advance health and medicine, a systematic review. Journal of general internal medicine, 2014. 29(1): pp. 187-203.
Mazor, K.M., et al., Collecting validity evidence for an assessment of professionalism: findings from think-aloud interviews. Academic Medicine, 2008. 83(10): pp. S9-S12.
Holmboe, E.S., Faculty and the observation of trainees' clinical skills: problems and opportunities. Academic Medicine, 2004. 79(1): pp. 16-22.
Kassebaum, D.G. and R.H. Eaglen, Shortcomings in the evaluation of students' clinical skills and behaviors in medical school. Academic Medicine, 1999. 74(7): pp. 842-849.
Pulito, A.R., et al., What do faculty observe of medical students' clinical performance? Teaching and learning in medicine, 2006. 18(2): pp. 99-104.
Dolmans, D., et al., Factors adversely affecting student learning in the clinical learning environment: A student perspective. Education for Health, 2008. 21(3), 10 pages.
Watling, C.J., et al., Rules of engagement: Residents' perceptions of the in-training evaluation process. Academic Medicine, 2008. 83(10): pp. 597-S100.
Kristin Ficery, K.K. The (Independent) Doctor Will Not See You Now. Accenture 2015 Feb. 24, 2016; Available from: https://www.accenture.com/_acnmedia/Pdf-2/Accenture-The-Doctor-Will-Not-See-You.pdf#zoom=50, 12 pages.
Bureau of Labor Statistics U.S. Department of Labor. Occupational Outlook Handbook, 2016-17 Edition, 2014 Feb. 26, 2016]; Available from: http://www.bls.gov/ooh/healthcare/physician-assistants.htm, 8 pages.
Elliott, V.S. and D.I. Auerbach. Sharp increase expected in number of nurse practitioners. American Medical News 2012 Feb. 26, 2016]; Available from: http://w.sowega-ahec.org/uploads/197_AmedNews.pdf., 2 pagtes.
United States of America Department of Defense. Job Outlook and Opportunities to Get Ahead, Physician Assistants. myfuture.com 2013 Feb. 26, 2016]; Available from: http://www.myfuture.com/careers/growth/physician-assistants_29/1071.00, 3 pages.
Accreditation Council for Graduate Medical Education, ACGME Data Resource Book: Academic Year 2014-2015, in Chicago (IL): Accreditation Council for Graduate Medical Education2015, 32 pages.
Mullan, F., E. Salsberg, and K. Weider, Why a GME Squeeze Is Unlikely. New England Journal of Medicine, 2015. 373 (25): pp. 2397-2399.
Health, U.D.o. and H. Services, The physician workforce: projections and research into current issues affecting supply and demand. Rockville, MD: US Dept of Health and Human Services, 2008, 111 pages.
Walton, S.M., et al., Association between increased number of US pharmacy graduates and pharmacist counts by state from 2000-2009. American journal of pharmaceutical education, 2011. 75(4), 9 pages.
Hoist, D., et al., Crowd-sourced assessment of technical skills: An adjunct to urology resident surgical simulation training. Journal of Endourology, 2015. 29(5): pp. 604-609.

(56) References Cited

OTHER PUBLICATIONS

Chen, C., et al., Crowd-Sourced Assessment of Technical Skills: a novel method to evaluate surgical performance. Journal of Surgical Research, 2014. 187(1): pp. 65-71.

* cited by examiner

METHODS AND SYSTEMS FOR VIDEO-BASED COMMUNICATION ASSESSMENT

BACKGROUND OF THE INVENTION

Good communication is now recognized as essential to various professional fields, and particularly the practice of medicine. Training in how to communicate effectively with customers, clients, patients, and families is vital to developing competent and efficient communication skills. Notably, training in effective provider-patient communication is currently a requirement for medical school and residency program accreditation, and competency in communication is a requirement for licensure. Even when medical training is complete, more and more practicing medical care providers are finding that a portion of their salary is dependent on their ability to communicate with customers or patients. Healthcare reimbursement rates in particular are increasingly influenced by patients' ratings of how well their physicians, physician assistants, and nurse practitioners communicated with them. Such changes indicate that social, political, and financial forces have converged to influence companies, professionals, healthcare systems, and individual medical care providers to value communication, and to seek improvement in this area.

Current methods for assessing communication skills have significant disadvantages. For most busy professionals, few opportunities to practice and receive constructive, specific feedback on their communication skills exist. Within healthcare, as professional requirements for good communication skills increase, the demand for a cost-effective, timely method of evaluation also increases. Thus, cost-effective, time-conserving, and efficient systems and methods for improving and assessing communication skills of professionals, particularly health care professionals, are desirable.

SUMMARY OF THE INVENTION

Methods and systems for improving the communication skills of professionals are described. The methods and systems involve subjecting communication skills assessment participants to brief video "vignettes," to which the participants respond orally. The spoken responses are then rated by crowd-sourced raters (i.e., lay people paid to do tasks online) on the participants' effectiveness and competency in communication. For example, the methods and systems may be used to assess the ability of healthcare providers to communicate effectively with patients, and to provide feedback on their communication skills. Customers, such as hospitals or medical training programs in the current example, may use results of the methods and systems described herein to target training and remediation efforts, to evaluate the effectiveness of training programs, or to document proficiency in communication. For instance, a director at a hospital might use results derived from the methods and systems to identify those providers performing at the lowest skill level, and most in need of remediation. Results derived from the methods and systems could also be used to identify the most skilled communicators, in order to engage those communicators in coaching their peers.

BRIEF DESCRIPTION OF THE DRAWINGS

The invention is best understood from the following detailed description when read in connection with the accompanying drawings, with like elements having the same reference numerals. The various features of the drawings may not be drawn to scale. On the contrary, the dimensions of the various features may be arbitrarily expanded or reduced for clarity. Included in the drawings are the following figures.

DETAILED DESCRIPTION OF THE INVENTION

Figure 1:
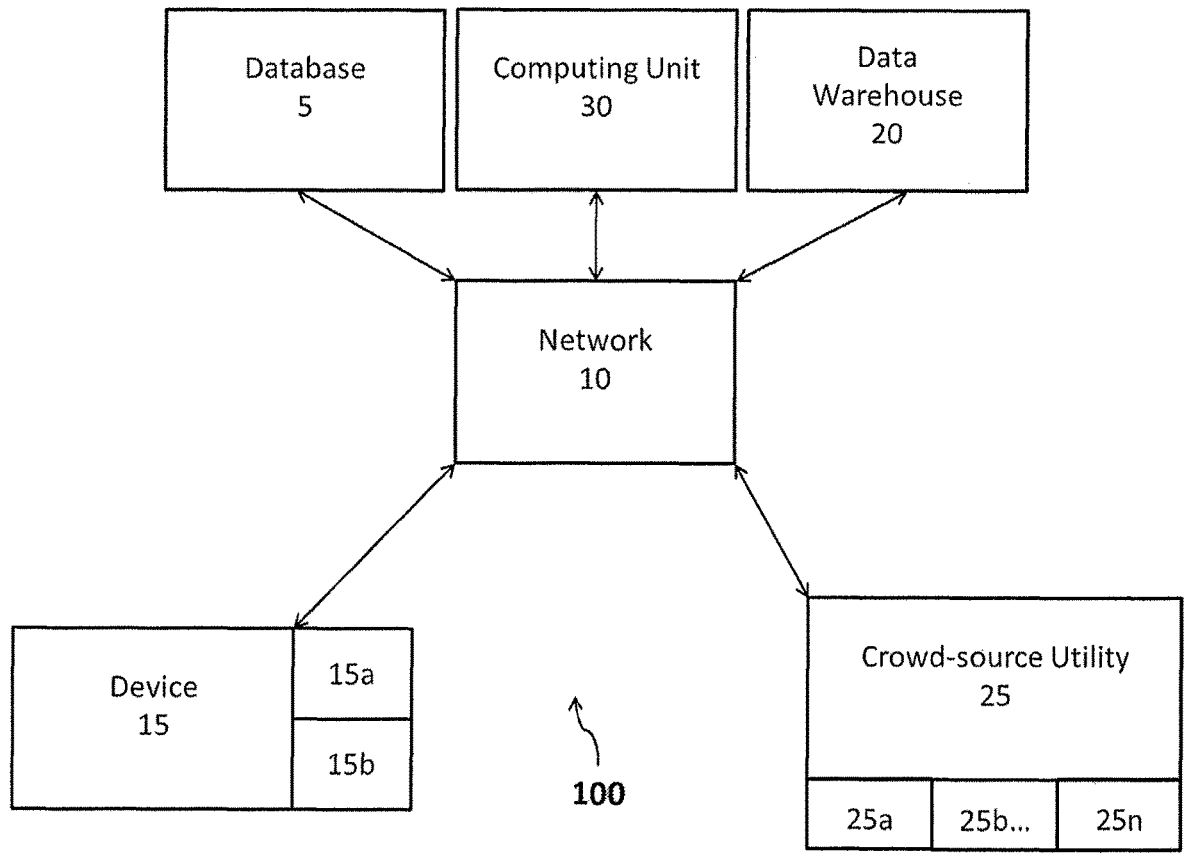
FIG. 1 is a block diagram of a system in accordance with aspects of the present invention.

There is a need for convenient, psychometrically strong assessment methods and systems for communication skills of professionals. Aspects of the invention provide a video-based communication assessment (VCA) method for assessing and improving a professional's communication skills. For example, a health care provider's skills at communicating with patients could be assessed using these methods and systems. Recognizing that professionals—including physicians, physician assistants, nurses, and nurse practitioners—typically lack an abundance of time, the VCA methods and systems are brief and efficient, taking approximately 30 minutes or less to complete. The VCA methods and systems are convenient for access, as they can be used wherever internet access and audio capturing capacity are available.

Users of the VCA methods and systems described herein may include professionals such as healthcare providers and healthcare trainees. The users/participants may receive detailed online feedback reports, including quantitative ratings of their performance, and ratings for comparison cohorts between peers.

The methods and systems may present participants with audiovisual stimuli to which participants may respond verbally. Verbal responses may then be rated by crowd-sourced raters. Within the context of a healthcare example, the methods and systems may use audiovisual stimuli as part of an assessment module to portray patients and to capture healthcare providers or healthcare trainees' spoken responses to these patient scenarios. Each audiovisual stimulus, or vignette, may consist of brief text description of a patient scenario, followed by a brief video clip of the patient reacting or asking a question. After each vignette, the participant may be prompted to respond by text saying: "What would you say next to this patient?" The methods and systems may then record a spoken response from the participant for each respective vignette. The audiovisual stimuli and response process is designed to be completed by the participant in 30 minutes or less. Each assessment module may include approximately 15-20 different patient vignettes.

Responses by the participant may then be transmitted to and stored in a data warehouse. The responses from the participant may then be retrieved over a network and rated using crowd-sourced raters. For healthcare professionals, raters may be "analog patients," i.e., lay people who take on a medical patient's perspective and participate in the on-line activity of completing tasks for third parties. The crowd-sourced raters/analog patients may view the vignettes and rate the spoken responses from the perspective of a group relevant to the participating professionals (e.g., from the perspective of a patient for a healthcare provider). After the rating, feedback reports including aggregated ratings of the participant's communication performance may be provided to the participant. Feedback reports may also contain exemplary spoken responses for each vignette, and curated rater comments or learning points may also be provided to the professional to facilitate learning.

FIG. 1 depicts an exemplary system 100 for assessing and improving communication skills of a participant, who may be a healthcare professional or a professional in another field. By way of example, the system 100 is described in the context of assessing and improving a healthcare professional's communication skills with patients, but the system 100 is not intended to be limited to use with only healthcare professionals.

The system 100 includes a database 5 for storing a number of prepared patient "vignettes." The system 100 additionally includes at least one wired or wireless network 10. A communication skills assessment program or application is hosted or served on a computing unit 30. A participant, such as a healthcare provider, may initiate the communication skills assessment program or application hosted on the computing unit 30 over the network 10 from a device 15 with network 10 access. After successful login, an assessment module comprising a number of patient vignettes designated for this participant will be displayed on the participant's device 15.

The device 15 has an audiovisual display 15a for displaying patient vignettes to the participant. The device 15 may also include an audio recorder 15b (e.g., a microphone) for recording the participant's spoken responses to each of the patient vignettes. Each spoken response may correspond to a specific patient vignette. Each recorded response and its corresponding patient vignette may be stored in one or more electronic files.

The system 100 may also include a data warehouse 20 for storing electronic files. The participant may use their device 15 to submit the one or more electronic files containing a verbal response to each vignette over the network 10 to the data warehouse 20. The data warehouse 20 may be closely associated with the computing unit 30, and the computing unit 30 may include the data warehouse 20.

The system also includes a crowd-source utility 25 including a plurality of crowd-sourced raters 25a-25n (e.g., analog patients). The computing unit 30 may assemble responses from multiple participants to a single vignette from the data warehouse 20 into "packages" for rating. Packages may include 5-20 responses to a single vignette, the vignette, and the rating items on which each response will be evaluated on items such as "I feel this doctor would be interested in me and what I had to say," "I would feel this provider understood how I was feeling," or "I would feel this provider cared about me." Packages may additionally include open-ended questions for crowd-sourced raters to respond to. Packages may be shared from the computing unit 30 to the crowd-source utility 25 via the network 10 for rating.

Crowd-sourced raters 25a-25n may access the crowd-source utility 25 via a network 10. Raters 25a-25n from within the overall raters/analog patients pool of the crowd-source utility 25 may then evaluate spoken responses, delivered via the packages described above. Completed ratings 25a-25n of participant responses may be transmitted from the crowd-source utility 25 to the central computing unit 30, via the network 10.

The computing unit 30 may then aggregate ratings for each vignette done by each participant from the plurality of raters 25a-25n. The computing unit 30 may then aggregate across all vignettes for a participant. Ratings will be combined into a feedback report by the computing unit 30 for each participant, including aggregations within and across vignettes for each participant, which will be delivered via network 10 to the participant's device 15.

Figure 2:
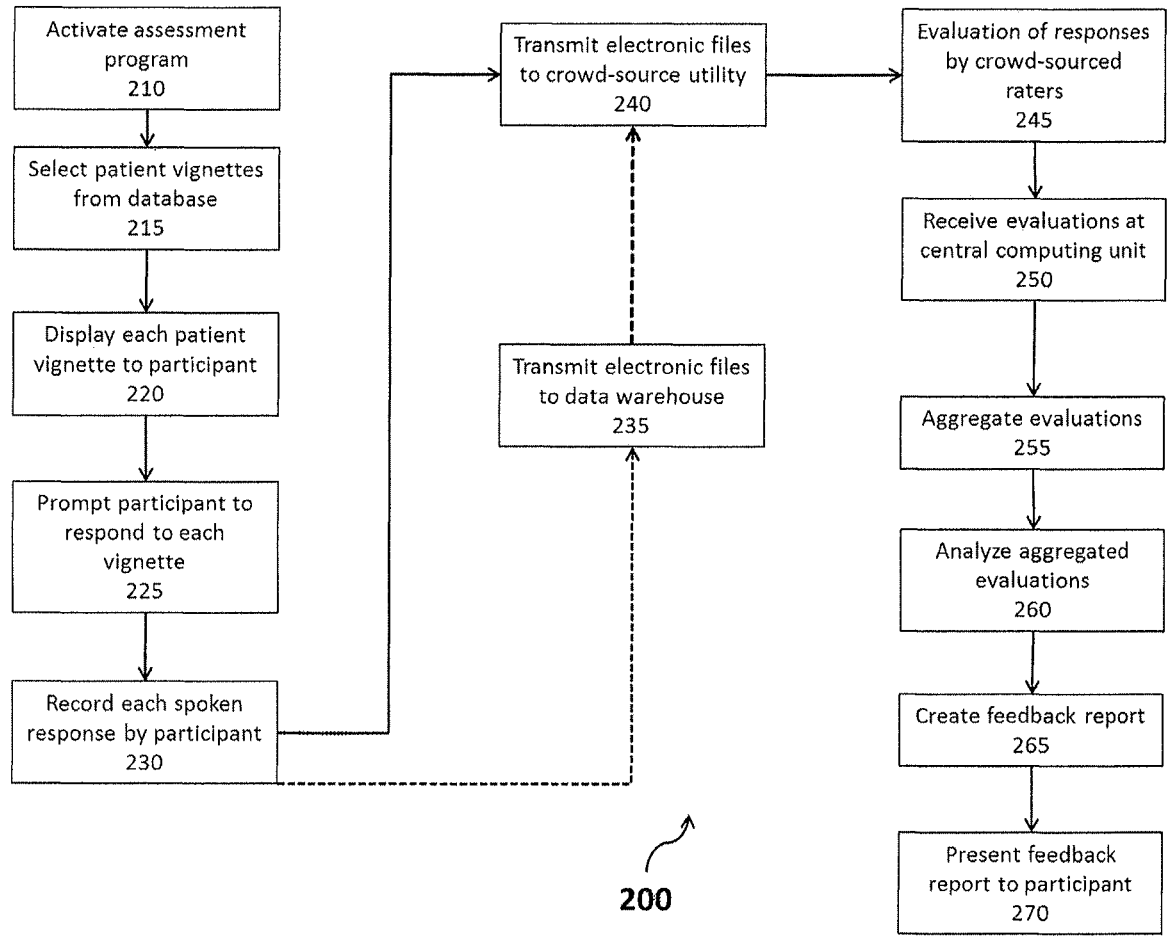
FIG. 2 is a flow chart of steps for assessing and improving a professional's communication skills in accordance with aspects of the present invention.

FIG. 2 depicts a flowchart 200 of method steps for assessing and improving a professional participant's communication skills with clients. By way of example, the flowchart method 200 is described in the context of assessing and improving a healthcare professional's communication skills with patients. However, the method 200 is not intended to be limited to this application and can be used in any number of situations in which it is desirable to assess and/or improve the communications skills of an individual or professional. Further, although the steps of flow chart 200 are described with reference to system 100, one of skill in the art will understand that other systems and components may be utilized. Additionally, one or more of the steps may be omitted or performed in a different order without departing from the spirit and scope of the invention.

Based on the exemplar system depicted in FIG. 1 and the flowchart outlined in FIG. 2, at step 210, the participant or healthcare provider activates an assessment application or program to begin the communications assessment. The participant may use a device 15 with Internet access/network connectivity to activate the assessment application or program over a network 10. The assessment application or program may be served or hosted on a computing unit 30.

Upon activating the assessment application or program, an assessment module including a predetermined plurality of stored patient vignettes from the database 5 at step 215 is displayed to the participant. Each patient vignette has two main components: (1) a brief textual component (approximately 1 to 10 sentences of text) providing any necessary background information on the patient subject of the patient vignette, and (2) a video clip of the patient subject making a statement or asking a question of the participant. Approximately 15-20 patient vignettes may be selected for display to the participant within a single assessment module. Each assessment module and/or vignette may be sent to a number of participants such that comparisons can be made between participants' communication skills. The computing unit 30 may select the assessment module from the database 5. The computing unit 30 may display or transmit the assessment module to a device 15 accessible by the participant, e.g., via network 10.

Each of the plurality of patient vignettes comprising the selected assessment module is then displayed in sequence to the participant at step 220. An audiovisual display 15a of the device 15 may be used to display the vignettes. The assessment module may be displayed on or transmitted to the device 15 and/or the audiovisual display 15a from the computing unit 30, e.g., via network 10.

After each patient vignette is displayed to the participant, the participant is prompted to record a spoken response. The participant may be prompted with textual, visual, or audio display by the application or program. Each spoken response corresponds to a respective patient vignette at step 225. At step 230, the participant's spoken responses may be captured in one or more electronic files. A recorder 15b associated with the device 15 may be used to capture the responses.

At step 235, the one or more electronic files may be transmitted to a data warehouse 20. Before transmission, the computing unit 30 may assemble responses from multiple participants to a single vignette from the data warehouse 20 into "packages" for rating. Packages may include 5-20 responses to a single vignette, the vignette, and the rating items on which each response will be evaluated. Packages containing a plurality of responses may be shared from the computing unit 30 to the crowd-source utility 25 via the network 10 for rating at step 240. The crowd-sourced raters 25a-25n may receive and review response packages at step 245, to evaluate the communication skills of each participant. Packages may also include open-ended questions to which responses may be submitted that solicit views of the crowd-sourced participants on optimal responses to each of the plurality of patient vignettes. The same package may be rated several times by different raters (e.g., 15-30 raters). Multiple raters are desired to achieve reliability in the ratings. Each crowd-sourced rater may evaluate and rate each of the spoken responses on multiple aspects of communication skills.

The plurality of crowd-sourced raters 25a-25n may then transmit their ratings of the participant responses to a central computing unit 30 at step 250. At step 255, for each respective vignette that an individual participant responded to, ratings received from the plurality of crowd-sourced raters are aggregated. Aggregations may also be made across vignettes for an individual participant. Computing unit 30 may aggregate the ratings. At step 265, a feedback report including aggregations for each vignette and across vignettes for each participant is created from the ratings. The feedback report may be created by the computing unit 30 and sent to the participant for presentation at step 270. The feedback report may also be provided to the participant's employer or anyone with an interest in improving the participant's communication skills, such as a professor, teacher, or coach. The computing unit 30 may use the network 10 to send the feedback report to the participant, or to a device 15 used by the participant.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for assessing communication skills of a participant, the method comprising:
   selecting a plurality of vignettes from a database to display to the participant, each of the vignettes including a textual component providing information about a patient, and a video clip of the patient making a statement or asking a question;
   displaying, with an audiovisual display, the plurality of vignettes to the participant;
   prompting the participant to record a spoken response to each of the plurality of vignettes, each spoken response corresponding to a respective vignette,
   capturing, with a device that has a recorder, the spoken responses by the participant in at least one electronic file,
   transferring over a network, the at least one electronic file and the vignettes corresponding to the spoken responses in the at least one electronic file to a crowd-source utility having a plurality of crowd-sourced raters,
   receiving, with a computing unit from the plurality of crowd-sourced raters, ratings made by the plurality of crowd-sourced raters for each of the spoken responses by the participant to the corresponding vignettes, such that each of the spoken responses receives at least two of the ratings from at least two different crowd-sourced raters of the plurality of crowd-sourced raters,
   wherein each of the ratings for each of the spoken responses are based on at least two questions answered by the at least two different crowd-sourced raters, the questions gauging subjective reactions of the at least two different crowd-sourced raters relating to at least two aspects of communication skills of the participant;
   aggregating, with the computing unit, each rating received from the plurality of crowd-sourced raters associated with the corresponding spoken responses from each participant in the at least one electronic file;
   analyzing, with the computing unit, the aggregated ratings to determine a vignette level rating of the aggregated ratings for the participant for each respective vignette,
   determining an overall vignette rating of the aggregated ratings for the participant and other participants for each respective vignette;
   creating, with the computing unit, a feedback report for each vignette level rating and for the overall vignette rating; and
   presenting the respective feedback report to each participant for each vignette and across vignettes.

2. The method according to claim 1, wherein the plurality of vignettes includes between about 15 and 20 vignettes selected from the database.

3. The method according to claim 1, wherein each vignette comprises multiple sentences of text providing background on the vignette subject of the vignette displayed to the participant, and wherein each vignette further comprises a video of the vignette subject making a statement or asking a question of the participant for display to the participant.

4. The method according to claim 1, wherein each rater within the plurality of crowd-sourced raters receives a plurality of spoken responses to a single vignette from a plurality of participants, and wherein each rater evaluates each of the plurality of spoken responses to the single vignette.

5. The method according to claim 4, wherein each rater evaluates each of the plurality of spoken responses by rating each response on a rating scale with a plurality of items.

6. The method according to claim 1, wherein the step of transferring each vignette and related spoken responses further includes transferring open-ended questions soliciting views of the crowd-sourced raters on optimal responses to each of the plurality of vignettes to facilitate feedback to the participant.

7. The method according to claim 6, further comprising:
   receiving, at the computing unit, responses to the open-ended questions from the crowd-sourced raters on optimal responses to each of the plurality of vignettes.

8. The method according to claim 1, wherein the step of prompting the participant to record a spoken response is carried out by the device.

9. The method according to claim 1, further comprising:
   transmitting, with the device, the at least one electronic file and the vignettes corresponding to the spoken responses to a data warehouse;
   packaging, with the computing unit, the at least one electronic file and the vignettes corresponding to the spoken responses in the data warehouse into one or more packages, and
   sending, with the computing unit via the network, the one or more packages to the crowd-source utility.

10. The method according to claim 9, wherein the one or more packages include a plurality of responses to a single vignette, the single vignette, and rating items on which the plurality of responses are evaluated.

11. The method according to claim 1, further comprising:
   transmitting, with the crowd-source utility, the ratings of each of the spoken responses by the participant to the corresponding vignettes.

12. A system for assessing effectiveness of communications by a healthcare provider, the system comprising:
  a database configured to store vignettes and assessments, which are collections of pre-assembled vignettes, each of the vignettes including a textual component providing information about the patient, and a video clip of the patient making a statement or asking a question;
  a network-connected device having an application or access to a website configured to prompt a participant to provide spoken responses to the vignettes, to store spoken responses by the participant and corresponding vignettes in one or more electronic files, and to present feedback reports to the participant, the device having an audiovisual display and a recorder, wherein:
    the audiovisual display is configured to display vignettes, and
    the recorder is configured to capture the spoken responses;
  a crowd-source utility having a plurality of crowd-sourced raters;
  a computing unit configured to:
    aggregate ratings of the plurality of crowd-sourced raters for each of the spoken responses, such that each of the spoken responses receives at least two of the ratings from at least two different crowd-sourced raters of the plurality of crowd-sourced raters, wherein each of the ratings for each of the spoken responses are based on at least two questions answered by the at least two different crowd-sourced raters, the questions gauging subjective reactions of the at least two different crowd-sourced raters relating to at least two aspects of communication skills of the participant,
    analyze the aggregated ratings to determine a vignette level rating of the aggregated ratings for the participant for each respective vignette, determine an overall vignette rating of the aggregated ratings for the participant and other participants for each respective vignette, and
    create a feedback report for each vignette level rating and for the overall vignette rating; and
  a network configured to:
    transfer the one or more electronic files from the network-connected device to the crowd-source utility,
    transfer the ratings from the crowd-sourced raters of the crowd-source utility to the computing unit, and
    transfer the feedback reports from the computing unit to the network-connected device.

13. The method according to claim 1, wherein the respective feedback report for each participant also includes exemplary spoken responses for each vignette, rater comments, and learning points.

14. The method according to claim 1, further comprising:
  comparing the vignette level rating of the participant to another vignette level rating of at least one other participant to determine the relative communication skills between the participant and the at least one other participant.

15. The method according to claim 1, wherein the ratings received from the plurality of crowd-sourced raters are based on multiple aspects of communication skills.

* * * * *